UNITED STATES PATENT OFFICE.

GEORGE J. HUSSMAN, OF ST. LOUIS, MISSOURI.

COMPOSITION FOR MASKING THE ACRID TASTE OF EPSOM SALT.

1,375,154.     Specification of Letters Patent.     Patented Apr. 19, 1921.

No Drawing.     Application filed April 29, 1920. Serial No. 377,593.

*To all whom it may concern:*

Be it known that I, GEORGE J. HUSSMAN, a citizen of the United States, residing at 5258 Northland avenue, in the city of St. Louis, Missouri, have invented new and useful improvements in a composition for masking the acrid taste of Epsom salt and for the resulting agreeable medicinal product, compound, or composition of matter, by which process and in which product the normal bitter and unpleasant taste of the salt is neutralized and masked, of which process and product the following is a specification.

This invention relates to a process for making compounds of Epsom salt in such a way that the acrid and disagreeable taste thereof will be thoroughly masked or neutralized; and the invention also relates to the resulting agreeable medicinal product.

In carrying out this process and developing the said product, I employ as masking agents for the salt body, soluble saccharin, oil of anise, and oil of peppermint. To produce the best results, the ingredients are preferably taken in about the following proportions:

48 lbs. of Epsom salt;
8 oz. of soluble saccharin;
5 oz. of oil of anise, U. S. P.
5 oz. of oil of peppermint, single distilled;
10 oz. of water.

However, for a cheaper grade of the product, the said masking agents, to-wit: the saccharin, and oils of anise and peppermint, may each be reduced as much as 50 per cent. for the same quantity, 48 lbs. of the salt, without seriously impairing the resulting compound.

These ingredients are then blended under the following process:

The water is heated in a suitable container and the soluble saccharin dissolved therein. The oils of anise and peppermint are mixed together in a separate container. The Epsom salt is placed in a suitable mixer, preferably a rotary mixer, and the saccharin solution is slowly added to the salt body, the latter being constantly stirred the while, and this mixing operation is continued for about ten minutes. The anise and peppermint oil solution is then slowly added to the salt body, the entire mass being constantly stirred the while, and this stirring and mixing is continued for from twenty to thirty minutes, or until all of the crystals are impregnated with the aromatics. The mixture is then drawn off and allowed to dry at about room temperature.

The resulting product will be found quite pleasant to the taste, with the acrid quality of the salt thoroughly masked and neutralized.

It is to be understood that the water is used merely as a vehicle to carry the saccharin into the salt and to facilitate the mixing of the saccharin with the salt, and it would be possible to intermix the saccharin and salt in their dry state.

What I claim to be new and patentable is:—

A masked and agreeable Epsom salt compound, comprising a major portion of Epsom salt and a minor portion comprising a mixture of saccharin, oil of anise and oil of peppermint, in substantially the proportions stated.

GEORGE J. HUSSMAN.

Witnesses:
    M. L. GERAU,
    A. K. DOHLE.